United States Patent
Stallings et al.

(10) Patent No.: US 8,942,767 B2
(45) Date of Patent: Jan. 27, 2015

(54) COMMUNICATIONS CONVERGENCE AND USER INTERFACE SYSTEMS, APPARATUSES, AND METHODS

(75) Inventors: Heath Stallings, Colleyville, TX (US); Brian F. Roberts, Frisco, TX (US); Donald H. Relyea, Dallas, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 774 days.

(21) Appl. No.: 12/339,811

(22) Filed: Dec. 19, 2008

(65) Prior Publication Data
US 2010/0159994 A1    Jun. 24, 2010

(51) Int. Cl.
*H04M 1/00* (2006.01)
*H04B 1/38* (2006.01)
*G06F 3/0482* (2013.01)
*H04M 1/725* (2006.01)

(52) U.S. Cl.
CPC ......... *H04M 1/72583* (2013.01); *G06F 3/0482* (2013.01); *H04M 1/72547* (2013.01); *H04M 2250/60* (2013.01)
USPC .......................................................... 455/566

(58) Field of Classification Search
USPC ....................................................... 455/566
See application file for complete search history.

(56) References Cited

U.S. PATENT DOCUMENTS

| | | | |
|---|---|---|---|
| 7,299,257 B2 | 11/2007 | Boyer et al. | |
| 7,356,332 B2 | 4/2008 | Pell et al. | |
| 7,450,970 B2 * | 11/2008 | Jung | 455/566 |
| 2006/0258388 A1 * | 11/2006 | Sato | 455/550.1 |
| 2006/0270461 A1 * | 11/2006 | Won et al. | 455/566 |
| 2007/0135099 A1 | 6/2007 | Taylor et al. | |
| 2007/0261002 A1 * | 11/2007 | Hu et al. | 715/810 |
| 2008/0045184 A1 | 2/2008 | Randall et al. | |
| 2008/0153459 A1 * | 6/2008 | Kansal et al. | 455/412.1 |
| 2008/0220752 A1 * | 9/2008 | Forstall et al. | 455/415 |
| 2008/0242362 A1 * | 10/2008 | Duarte | 455/566 |
| 2009/0161845 A1 * | 6/2009 | Adams et al. | 379/93.23 |

OTHER PUBLICATIONS

Google, Gmail Screenshot, as accessed Dec. 15, 2008.

* cited by examiner

*Primary Examiner* — Marisol Figueroa

(57) ABSTRACT

In an exemplary method, communications data representative of communication instances of distinct types is converged and a graphical user interface ("GUI") including a set of listings representative of a grouping of the communication instances of distinct types is displayed. In certain embodiments, at least one of the communication instances represented in the set of listings includes a voice type communication instance. In certain embodiments, a user selection of one of the listings displayed in the GUI is detected, the selected listing associated with a contact, and another set of listings representative of another grouping of converged communication instances of distinct types is displayed in response to the user selection. In certain embodiments, each of the communication instances in the other grouping is associated with the contact. In certain embodiments, the other set of listings is displayed as a subset within the set of listings in the GUI.

17 Claims, 15 Drawing Sheets

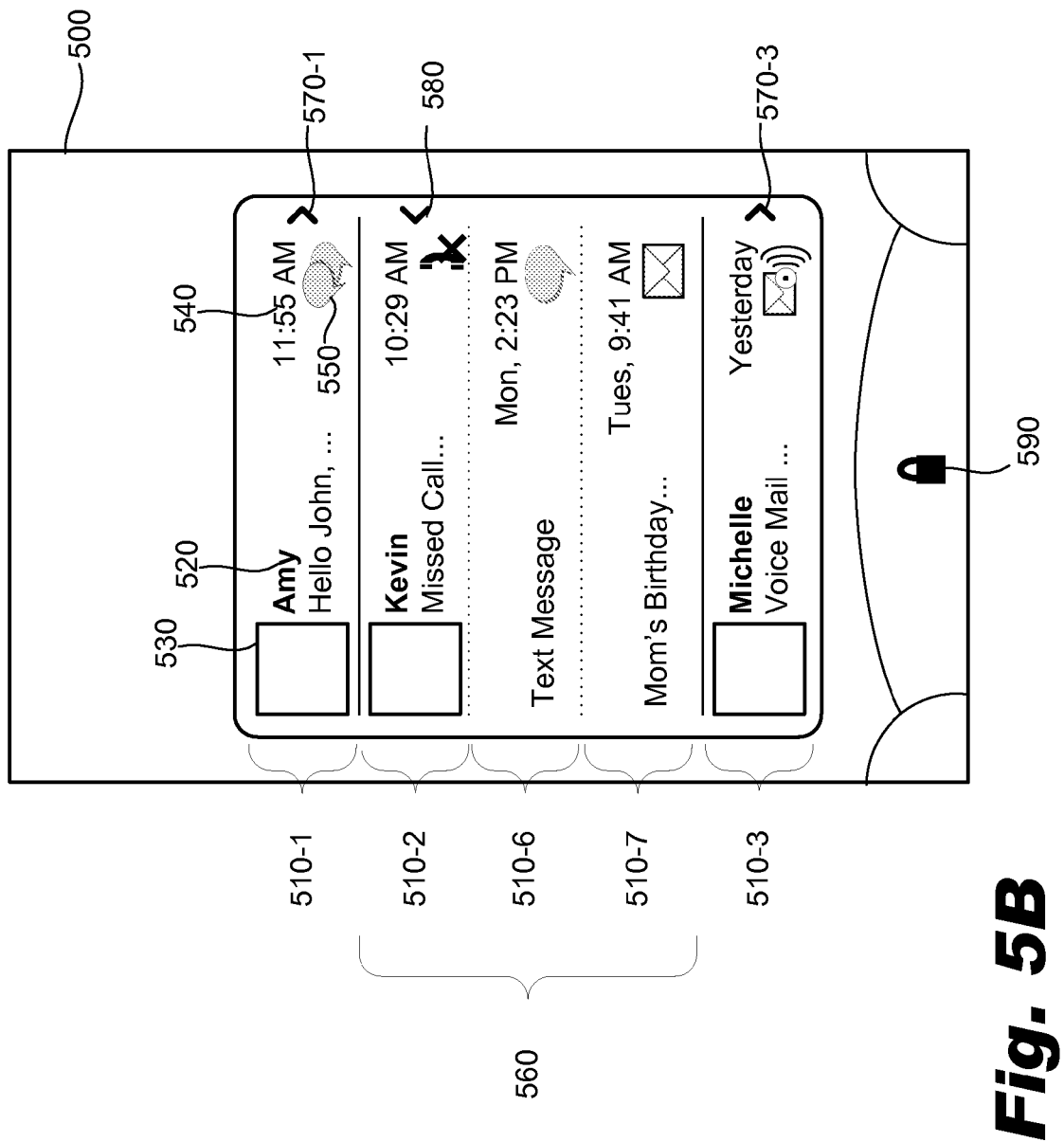

COMMUNICATIONS CONVERGENCE AND USER INTERFACE SYSTEMS, APPARATUSES, AND METHODS

BACKGROUND INFORMATION

Advances in electronic communications technologies and devices have interconnected people perhaps better than ever before. To illustrate, mobile phone devices, which were previously used for voice communications only, are increasingly being used for other types of communications such as text message and electronic mail ("e-mail") communications. The proliferation of different types of communications has challenged designers of user interfaces for electronic devices. The challenges are exacerbated for electronic devices that are small in size such as a mobile phone device.

Traditionally, communications of different types have operated independently of one another. Consequently, graphical user interfaces ("GUIs") and/or applications associated with different types of communication have also typically operated independently of one another. Unfortunately, this has introduced limitations into conventional user interfaces and communications devices. As an example, a user of a conventional mobile phone device may be forced to utilize and/or navigate through multiple different and/or independent GUIs and/or applications in order to access communications data and/or communications services of different types.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

FIGS. 5A-5B illustrate a graphical user interface having exemplary converged communications views displayed therein.

DETAILED DESCRIPTION OF PREFERRED EMBODIMENTS

Figure 1:
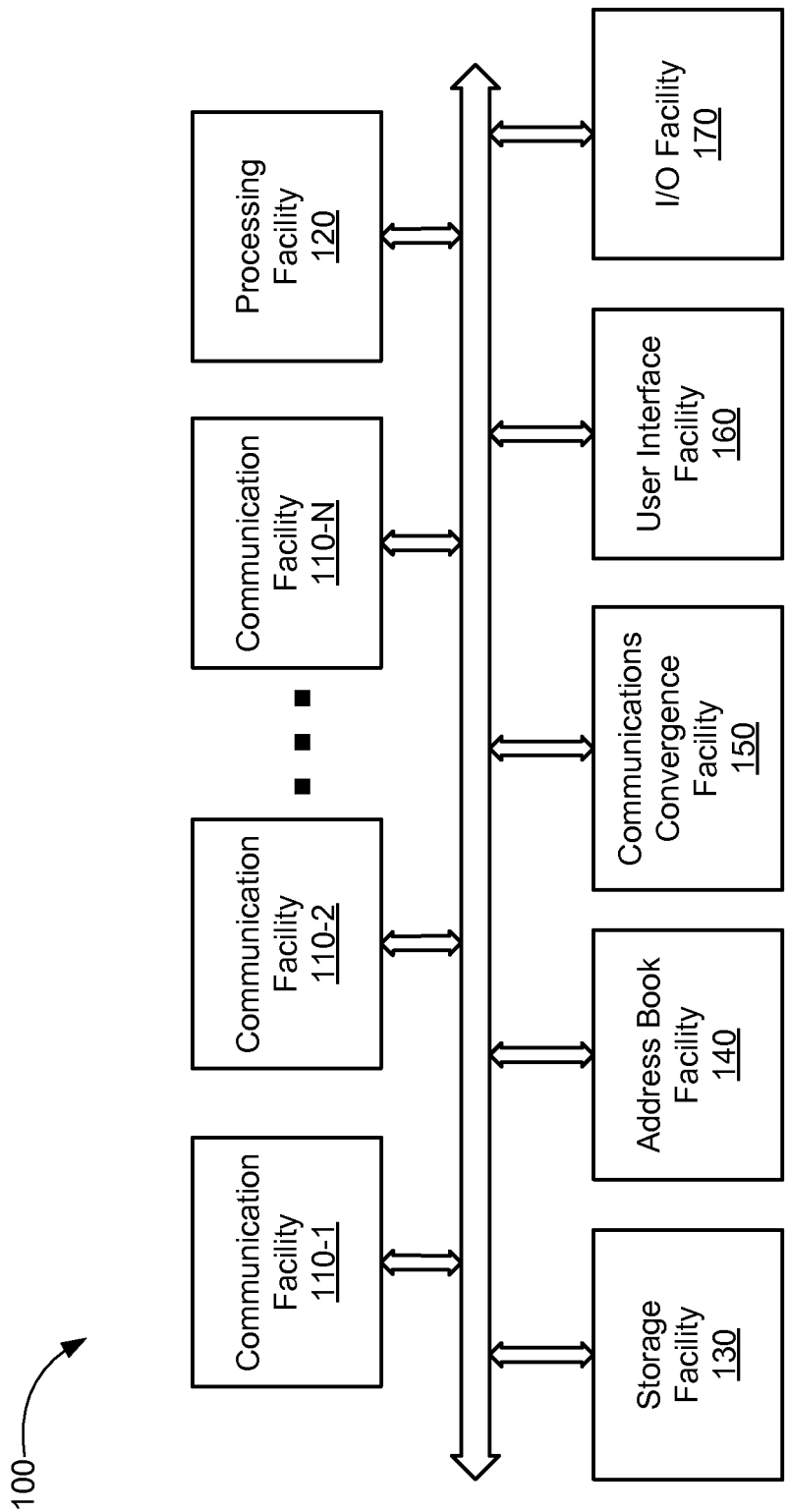
FIG. 1 illustrates an exemplary communications convergence and user interface system.

Exemplary communications convergence and user interface systems, apparatuses, and methods are described herein. In certain exemplary embodiments, communications data representative of communication instances of distinct types may be converged and a graphical user interface ("GUI") displayed. The GUI may include a set of listings representative of a grouping of the communication instances of distinct types. In certain embodiments, user input may be detected and another set of listings representative of another grouping of communication instances displayed in response to the user input. In certain embodiments, the user input may include a user selection of one of the listings in the set of listings, the selected listing may be associated with a contact, and each of the communication instances in the other grouping may be associated with the contact. In certain embodiments, at least one listing in the other set of listings may be representative of a thread of communication instances of distinct types with the contact.

As used herein, a "communication instance" may include any communication between two or more communication devices and/or between two or more persons or entities ("contacts") by way of the devices. Examples of such communication instances may include, but are not limited to, voice communications (e.g., Voice Over IP ("VoIP"), Public Switched Telephone Network ("PSTN"), or other active, attempted, completed, or recorded voice calls and/or messages), text messages (e.g., Short Message Service ("SMS") messages), media messages (e.g., Multimedia Message Service ("MMS") messages), e-mail messages, chat messages (e.g., Instant Messaging ("IM") messages), and subscriber feed messages (e.g., RSS feed messages).

As used herein, a "type of communication" or "communication type" may refer to a category of communications having a common platform, protocol, and/or standard, and/or a category of communications associated with a particular communications service. Hence, distinct communication types may employ distinct platforms, protocols, and/or standards, and/or may be associated with distinct communications services. In certain embodiments, distinct communication types may include, but are not limited to, a voice communication type, text message communication type, media message communication type, e-mail message communication type, chat message communication type, subscriber feed communication type, or a combination or subcombination thereof. Accordingly, examples of communication instances of distinct types may include, but are not limited to, a voice type communication instance (e.g., VoIP, PSTN, or other active, attempted, completed, or recorded voice calls and/or messages), text message type communication instance (e.g., an SMS message), a media message type communication instance (e.g., an MMS message), an e-mail message type communication instance (e.g., an e-mail message), a chat message type communication instance (e.g., an IM message), and a subscriber feed type communication instance (e.g., an RSS feed message).

Exemplary embodiments of communications convergence and user interface systems, apparatuses, and methods will now be described in more detail with reference to the accompanying drawings.

FIG. 1 illustrates an exemplary communications convergence and user interface system 100 (or simply "system 100"). System 100 may include communications facilities 110-1 through 110-N (collectively referred to as "communications facilities 110"), a processing facility 120, a storage facility 130, an address book facility 140, a communications convergence facility 150, a user interface facility 160, and an input/output ("I/O") facility 170 communicatively coupled to one another as shown in FIG. 1. The components of system 100 may communicate with one another, including sending data to and receiving data from one another, using any suitable communications technologies.

In some examples, system 100, or one or more components of system 100, may include any computing hardware and/or instructions (e.g., software programs), or combinations of computing instructions and hardware, configured to perform one or more of the processes described herein. In particular, it should be understood that system 100, or one or more components of system 100, may be implemented on one physical computing device or may be implemented on more than one physical computing device. Accordingly, system 100 may include any one of a number of computing devices employing any of a number of computer operating systems.

One or more of the processes described herein may be implemented at least in part as computer-executable instructions, i.e., instructions executable by one or more computing devices, tangibly embodied in a computer-readable medium. In general, a processor (e.g., a microprocessor) receives instructions, e.g., from a memory, a computer-readable medium, etc., and executes those instructions, thereby performing one or more processes, including one or more of the processes described herein. Such instructions may be stored and transmitted using a variety of known computer-readable media.

A computer-readable medium (also referred to as a processor-readable medium) includes any medium that participates in providing data (e.g., instructions) that may be read by a computer (e.g., by a processor of a computer). Such a medium may take many forms, including, but not limited to, non-volatile media, volatile media, and transmission media. Non-volatile media may include, for example, optical or magnetic disks and other persistent memory. Volatile media may include, for example, dynamic random access memory ("DRAM"), which typically constitutes a main memory. Transmission media may include, for example, coaxial cables, copper wire and fiber optics, including the wires that comprise a system bus coupled to a processor of a computer. Transmission media may include or convey acoustic waves, light waves, and electromagnetic emissions, such as those generated during radio frequency ("RF") and infrared ("IR") data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computing device can read.

Accordingly, each of the components of system 100 may be implemented as hardware, computing instructions (e.g., software) tangibly embodied on a computer-readable medium, or a combination of hardware and tangibly embodied computing instructions configured to perform one or more of the processes described herein. In certain embodiments, for example, communications convergence facility 150 and/or user interface facility 160 may be implemented as one or more software applications embodied on one or more computer-readable media and configured to direct processing facility 120 and/or other components of system 100 to execute one or more of the processes described herein.

Figure 2:
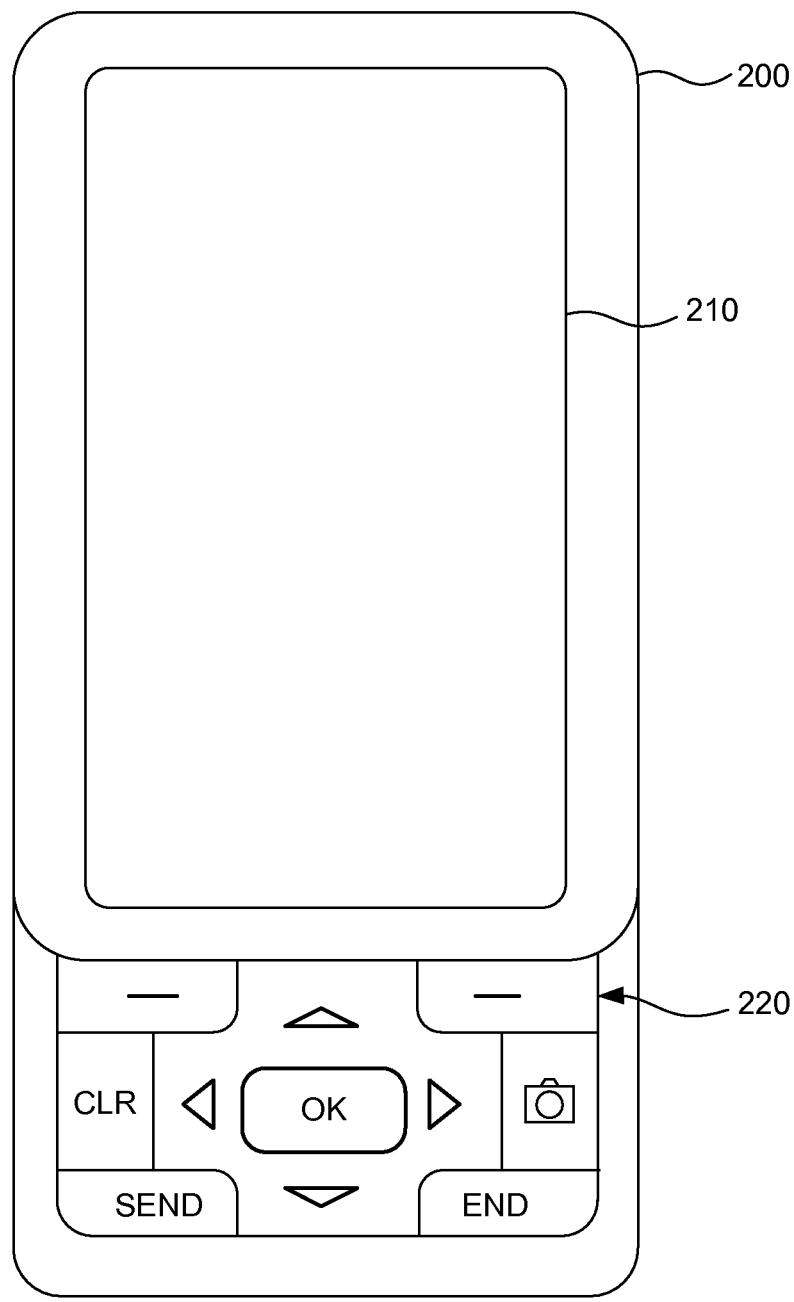
FIG. 2 illustrates an exemplary implementation of the system of FIG. 1.

System 100 may be implemented as may suit a particular application. FIG. 2 illustrates an exemplary device 200 having system 100 implemented thereon. Device 200 may include one or more of the components of system 100 shown in FIG. 1 and may be configured to perform one or more of the processes and/or operations described herein. Device 200 may include, but is not limited to, a communications device, mobile device (e.g., a mobile phone device), handheld device, computer, phone device (e.g., Verizon Hub device), personal-digital assistant device, set-top box, and any device configured to perform one or more of the processes and/or operations described herein. In certain embodiments, device 200 includes a communications device configured to send, receive, and process communications of distinct types.

As shown in FIG. 2, device 200 may include a display 210, which may be part of I/O facility 170, and may include one or more display components and technologies configured to display one or more GUIs for viewing by a user of device 200. For example, display 210 may include a display screen configured to display one or more GUIs for viewing by a user of device 200. In certain implementations, the display screen may comprise a touch screen configured to receive touch input. The touch screen may employ any suitable single-touch and/or multi-touch touch screen technologies. Examples of GUIs and various GUI views that may be displayed on display 210 are described in detail further below. In addition to display 210, device 200 may include input mechanisms such as one or more of the input buttons 220 shown in FIG. 2. Input buttons 220 may be part of I/O facility 170.

Figure 3:
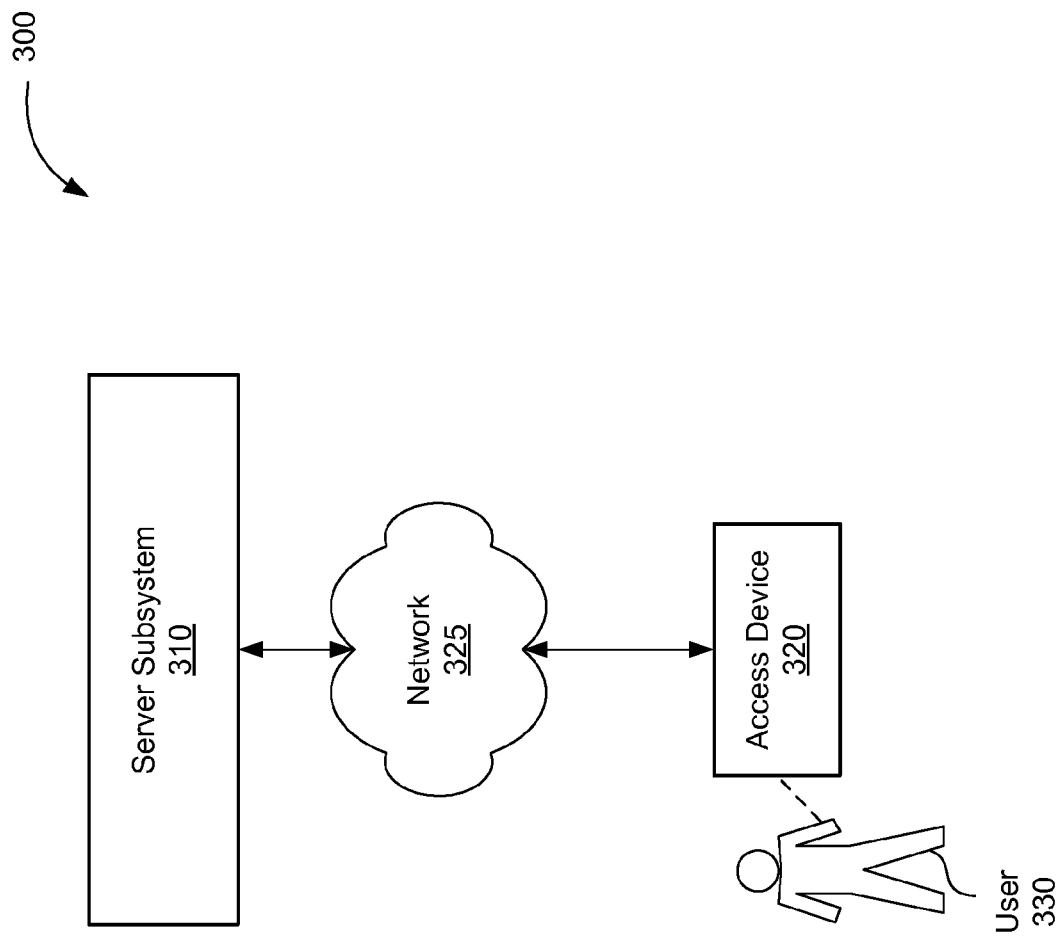
FIG. 3 illustrates another exemplary implementation of the system of FIG. 1.

The implementation of system 100 shown in FIG. 2 is illustrative only. Other embodiments may include alternative implementations. As an example, FIG. 3 illustrates another exemplary implementation 300 of system 100. In implementation 300, components of system 100 may be distributed across a server subsystem 310 and an access device 320 configured to communicate with server subsystem 310 by way of a network 325. Distribution of components of system 100 across server subsystem 310 and access device 320 may be arranged as may suit a particular application. In certain examples, communications facilities 110 may be implemented in server subsystem 310, and communications convergence facility 150, user interface facility 160, and I/O facility 170 may be implemented in access device 320. In other examples, communications facilities 110 and communications convergence facility 150 may be implemented in server subsystem 310, and user interface facility 160 and I/O facility 170 may be implemented in access device 320. In yet other examples, communications facilities 110, communications convergence facility 150, and user interface facility 160 may be implemented in server subsystem 310, and I/O facility 170 may be implemented in access device 320. In yet other examples, any component of system 100 may be divided and distributed across server subsystem 310 and access device 320. For example, user interface facility 160 may be divided and distributed across server subsystem 310 and access device 320 in certain embodiments.

Server subsystem 310 may include at least one server with one or more of the components of system 100 implemented thereon. In certain embodiments, for example, server subsystem 310 may include multiple communications facilities 110 implemented on a plurality of servers. In other embodiments, server subsystem 310 may include a data store (e.g., storage facility 130) implemented on one or more servers and configured to store data representative of communications of distinct types.

Access device 320 may be associated with one or more users, which in certain embodiments may be subscribers to or users of one or more services (e.g., a communication service such as a mobile phone service) provided over network 325. As an example, FIG. 3 shows user 330 as being associated with access device 320.

Access device 320 may include any suitable device with one or more components of system 100 implemented thereon. In certain embodiments, for example, access device 320 may include I/O facility 170, or user interface facility 160 and I/O facility 170, such that access device 320 is configured to generate and/or display one of more of the GUIs described herein for viewing by user 330. Access device 320 may include, but is not limited to, a communications device, mobile device (e.g., a mobile phone device), handheld device, computing device (e.g., a desktop or laptop computer), phone device (e.g., Verizon Hub device), personal-digital assistant device, set-top box, a gaming device, a wireless communications device, and/or any other device having one or more components of system 100 implemented thereon.

Network 325 may include one or more networks, including, but not limited to, wireless networks, mobile telephone networks (e.g., cellular telephone networks), closed media networks, subscriber television networks, cable networks, satellite networks, the Internet, intranets, local area networks, public networks, private networks, optical fiber networks, broadband networks, narrowband networks, voice communications networks, Voice over Internet Protocol "(VoIP") networks, Public Switched Telephone Networks ("PSTN"), data communications networks, other communications networks, and any other networks capable of carrying communications and/or data representative of communications between access device 320 and server subsystem 310. Communications between server subsystem 310 and access device 320 may be transported using any one of above-listed networks, or any combination or sub-combination of the above-listed networks. In certain exemplary embodiments, network 325 includes a mobile phone network (e.g., a cellular phone network) and access device 320 includes a mobile phone device.

Access device 320 and server subsystem 310 may communicate over network 325 using any communication platforms and technologies suitable for transporting data and/or communication signals, including known communication technologies, devices, media, and protocols supportive of remote communications, examples of which include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Markup Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Evolution Data Optimized Protocol ("EVDO"), Time Division Multiple Access ("TDMA") technologies, Short Message Service ("SMS"), Multimedia Message Service ("MMS"), radio frequency ("RF") signaling technologies, wireless communication technologies (e.g., Bluetooth, Wi-Fi, etc.), in-band and out-of-band signaling technologies, and other suitable communications technologies.

Returning to FIG. 1, each of the elements shown therein will now be described in additional detail.

Processing facility 120 may include one or more processors and may be configured to execute and/or direct execution of one or more processes or operations described herein. Processing facility 120 may direct execution of operations in accordance with computer-executable instructions such as may be stored in storage facility 130 or another computer-readable medium. As an example, processing facility 120 may be configured to process data, including demodulating, decoding, and parsing acquired data, and encoding and modulating data for transmission by one of more of the communication facilities 110.

Storage facility 130 may include one or more data storage media, devices, or configurations and may employ any type, form, and combination of storage media. For example, the storage facility 130 may include, but is not limited to, a hard drive, network drive, flash drive, magnetic disc, optical disc, random access memory ("RAM"), dynamic RAM ("DRAM"), other non-volatile and/or volatile storage unit, or a combination or sub-combination thereof. Electronic data, including data described herein (e.g., communications data), may be temporarily and/or permanently stored in the storage facility 130.

I/O facility 170 may be configured to receive user input and provide user output and may include any hardware, firmware, software, or combination thereof supportive of input and output capabilities. For example, I/O facility 170 may include one or more devices for capturing user input, including, but not limited to, a microphone, speech recognition technologies, keyboard or keypad, touch screen component, receiver (e.g., an RF or infrared receiver), and one or more input buttons.

I/O facility 170 may include one or more devices for presenting output to a user, including, but not limited to, a graphics engine, a display (e.g., a display screen), one or more display drivers, one or more audio speakers, and one or more audio drivers. Output may include audio, visual (e.g., digital images), textual, and/or haptic output. In certain embodiments, for example, I/O facility 170 is configured to display one or more GUIs for viewing by a user. Exemplary GUIs and GUI views that may be displayed by I/O facility 170 are described further below.

Address book facility 140 may be configured to maintain an address book including data representative of one or more "contacts." As used herein, a "contact" refers to a person or other entity. Data representative of contacts may be referred to as "contacts data" and may include any information potentially useful for identifying and/or communicating with, or otherwise associated with, one or more contacts, including, but not limited to, contact identifiers (e.g., people's names), street addresses, telephone numbers, e-mail addresses, website addresses, network addresses, Uniform Resource Locators ("URLs"), employment information (e.g., a job title), personal information (e.g., names of family members, important dates, and marital status), etc.

Address book facility 140 may maintain an address book that is local to a device such as device 200. Additionally or alternatively, address book facility 140 may maintain a network address book hosted on server subsystem 310 and accessible to one or more access devices such as access device 320. In certain embodiments, address book facility 140 may be configured to maintain a connected address book in any of the ways described in co-pending U.S. patent application Ser. No. 12/242,515, entitled "Connected Address Book Systems and Methods," filed Sep. 30, 2008, the contents of which are hereby incorporated by reference in their entirety.

In certain embodiments, data associated with a contact may be organized into a profile associated with a person or other entity. As will be described further below, user interface facility 160 may be configured to provide data representative of a profile card associated with a person or other entity for display.

Communications facilities 110 may be configured to send, receive, and/or otherwise process communication instances. For example, communications facilities 110 implemented on device 200 may be configured to send and/or receive communication instances to/from other devices. Communications facilities 110 may employ any suitable technologies for processing communication instances, including sending and/or receiving signals representative of communication instances over one or more communication networks.

Communications facilities 110 may be configured to maintain data representative of communication instances. Such data, which may be referred to as "communications data,"

may be stored by one or more of the communications facilities 110 and/or on one or more suitable computer-readable media such as storage facility 330. Communications data may include any information descriptive of or otherwise associated with one or more communication instances. For example, communications data may include contact information descriptive of contacts associated with communication instances (e.g., sender and receiver contact information). Such contact information may include contact identifiers (e.g., contact names), phone numbers, e-mail addresses, and/or other information descriptive of parties to and/or devices associated with communication instances. Communications data may also include communication time stamps (e.g., start and end times), device identifiers, routing information, media attachments, communication content, address information, communication status information, communication type indicators, and/or other attributes or information descriptive of or otherwise associated with communication instances.

Communication facilities 110 may be configured to send, receive, and/or otherwise process communication instances of distinct types, including any of the types of communication instances disclosed herein. In certain embodiments, each of the communication facilities 110 may be configured to process a distinct type of communication instances. In such configurations, communications facilities 110 may be referred to as "heterogeneous communications facilities 110." As an example, communication facility 110-1 may be configured to process voice type communication instances, communication facility 110-2 may be configured to process text message type communication instances, and communication facility 110-N may be configured to process e-mail message type communication instances. System 100 may additionally or alternatively include one or more other communication facilities 110 configured to process one or more other types of communications. For instance, another communication facility 110 may be configured to process chat message type communication instances, media message type communication instances, or subscriber feed type communication instances.

Communications convergence facility 150 may be configured to converge data representative of communication instances of distinct types. Convergence of communications data representative of communication instances of distinct types may be accomplished in any suitable way and may include one or more operations. In certain embodiments, convergence may include retrieval of communications data representative of communication instances of distinct types from one or more of the communications facilities 110 and/or from one or more other data storage media such as storage facility 130. Convergence may further include using the retrieved communications data to generate one or more groupings of communication instances of distinct types. For example, communications convergence facility 150 may retrieve communications data representative of communication instances of distinct types and generate a grouping of the communications instances of distinct types.

Convergence of communications data may be based on one or more factors, which factors may be specified by a predefined convergence heuristic, user input, or a combination thereof. As an example, a convergence of communications data may include organizing communication instances of distinct types into a grouping based at least in part on time data (e.g., timestamps) associated with the communication instances. This may result in generation of a grouping of communication instances of distinct types arranged in chronological order. As another example, a convergence of communications data may include organizing communication instances of distinct types into a grouping based at least in part on a contact associated with the contact instances. This may result in generation of a grouping of communication instances of distinct types, each of which is associated with a particular contact. Other convergence factors may be used in other examples as may suit a particular application.

In certain examples, convergence of communications data representative of communication instances of distinct types may result in generation of a grouping of communication instances of distinct types associated with a common "thread" of communication instances. As used herein, a "thread of communications" or "communications thread" may include a plurality of communication instances associated having at least one common factor, such as a collection of communication instances associated with a conversation between contacts. For example, a thread of communication instances between contacts may include a series of text messages, a phone call following the text messages, and a media message following the phone call and transferring a media file.

Figure 4:
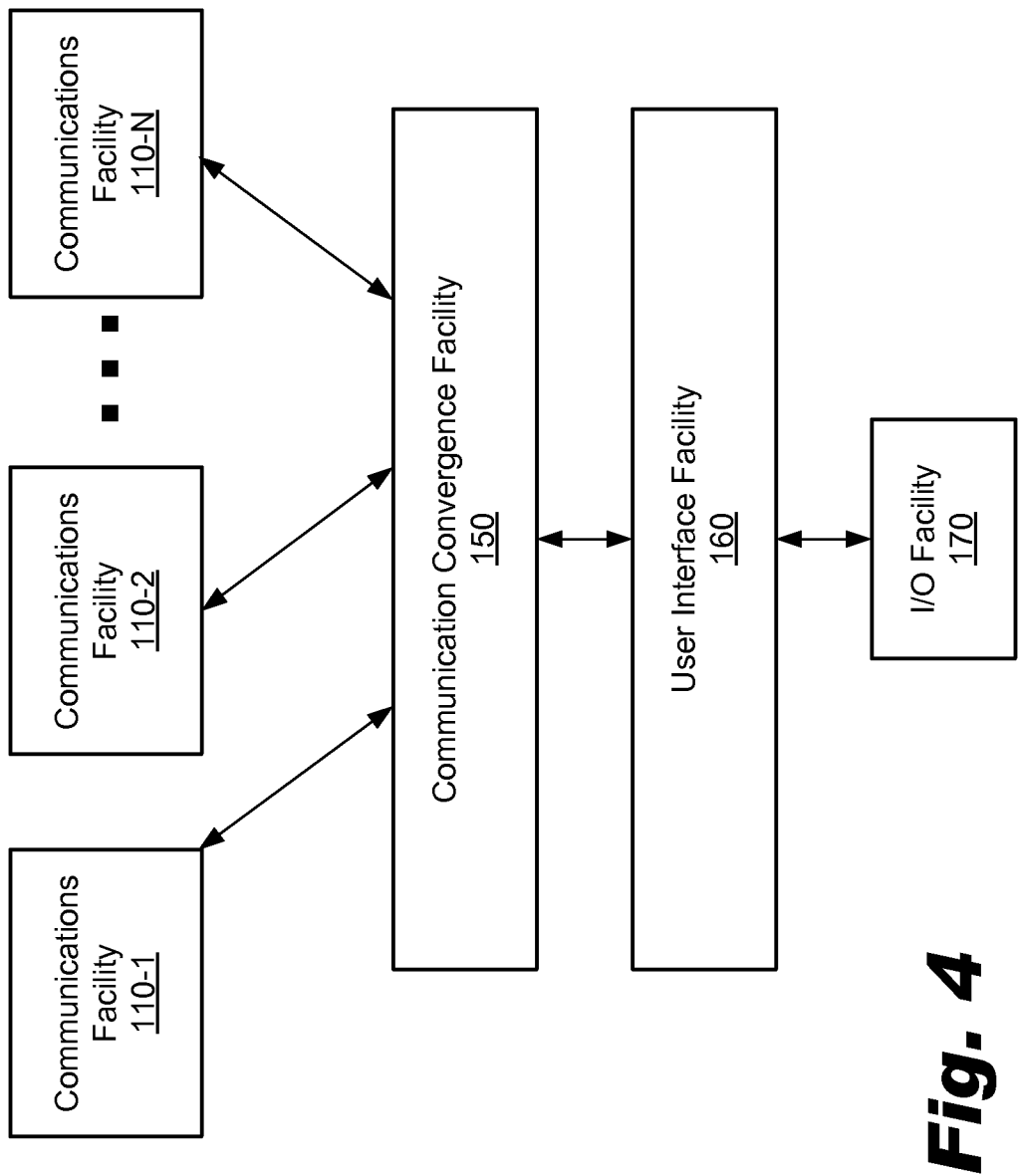
FIG. 4 illustrates an exemplary flow of data representative of communications of distinct types.

Communications convergence facility 150 may be configured to provide data representative of converged communication instances to user interface facility 160, which may be configured to receive and use the data to generate and provide data representative of one or more GUIs to I/O facility 170 for presentation to a user. FIG. 4 illustrates an exemplary flow of data representative of communication instances of distinct types. As shown, communications convergence facility 150 may retrieve and converge communications data from communications facilities 110-1 through 110-N. Communications convergence facility 150 may provide the converged communications data to user interface facility 160, which may use the converged data to generate and provide data representative of one or more GUIs and/or GUI views to I/O facility 170 for display.

User interface facility 160 may also be configured to detect user input and to initiate one or more operations in response to the user input. For example, I/O facility 170 may receive user input as previously described and provide a signal representative of the user input to user interface facility 160. User interface facility 160 may detect the signal and identify the user input. User interface facility 160 may initiate one or more operations in response to the detected user input. Examples of operations that may be performed in response to the user input may include converging communications data, generating one or more groupings of communication instances, and/or filtering one or more groupings of communication instances. Examples of these actions are described further below.

Figure 5A:
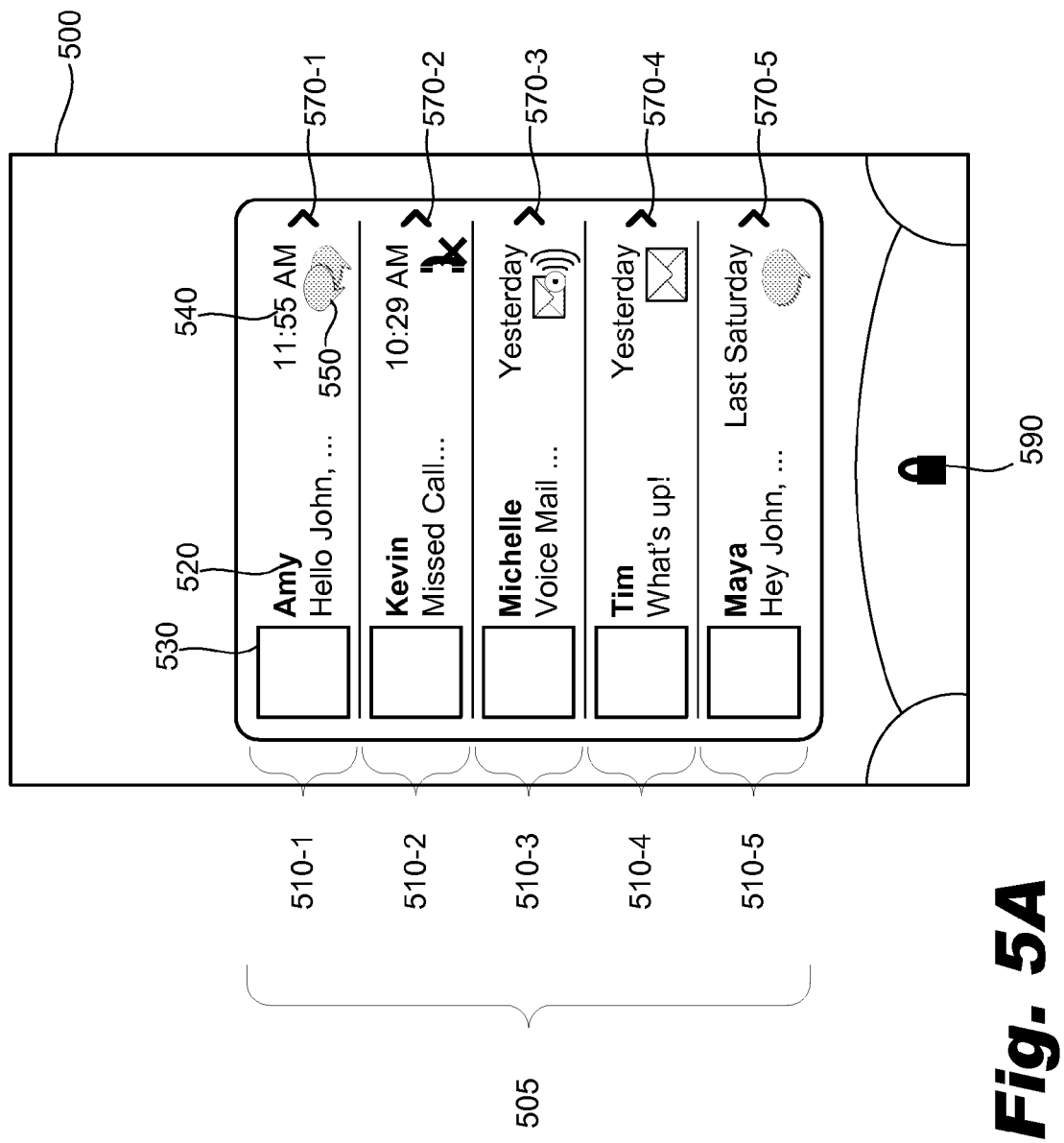

To help facilitate an understanding of convergence of communications of distinct types and associated user interfaces, several GUIs having examples of converged communications views included therein will now be described. FIGS. 5A-5B illustrate an exemplary graphical user interface 500 ("GUI 500") that may be displayed by I/O facility 170. As shown in FIG. 5A, GUI 500 may include a set 505 of listings (e.g., listings 510-1 through 510-5, collectively referred to herein as "listings 510") representative of a grouping of communication instances of distinct types. In the illustrated example, listing 510-1 is representative of a chat message type communication instance, listing 510-2 is representative of a voice type communication instance (e.g., a missed voice call), listing 510-3 is representative of another voice type communication instance (e.g., a voicemail message), listing 510-4 is representative of an e-mail message type communication instance, and listing 510-5 is representative of a text message type communication instance.

The grouping of communication instances represented by the set 505 of listings 510 may be generated by communications convergence facility 150 as described above. In the example illustrated in FIG. 5A, the grouping of communication instances includes communication instances of distinct types arranged in chronological order. This is illustrative only. Other groupings of communication instances, including other groupings of communication instances of distinct types, may be represented in GUI 500 in other examples.

In certain embodiments, each of the listings 510 in GUI 500 may be associated with a contact, such as the contact associated with communication instance corresponding to the listing 510. For example, listing 510-1 may be associated with a contact identified as "Amy," where "Amy" is a contact associated with (e.g., a sender of) the text message communication instance represented by listing 510-1.

As further shown in FIG. 5A, each of the listings 510 may include one or more graphical objects descriptive of or otherwise associated with a corresponding communication instance. For example, each of the listings 510 may include graphical objects representative of a contact associated with the corresponding communication instance (e.g., a contact name and an image associated with the contact), contents or partial contents of the corresponding communication instance, the type of the corresponding communication instance, and time, day, and/or date information associated with the corresponding communication instance. As an example, listing 510-1 includes a display of a contact name 520, an image 530 (e.g., digital photograph) associated with the contact, a time of day 540 associated with the corresponding communication instance, and a visual indicator 550 of the type (e.g., a chat message communication type) of the corresponding communication instance. In FIG. 5A, each of the other listings 510-2 through 510-5 includes similar graphical objects.

One or more of the graphical objects in GUI 500 may be selectable by a user. In certain embodiments, one or more of the listings 510 and/or graphical objects within the listings 510 may be selectable. A user selection of a graphical object may be made and detected in any suitable way. In some examples, a user selection may be made by a physical object (e.g., a finger) touching a graphical object displayed on a touch screen. I/O facility 170 may sense the object touching the graphical object and may provide a signal representative of the user selection to user interface facility 160, which may detect the user selection from the signal and initiate one or more operations in response to the user selection.

As an example, user interface facility 160 may detect a user selection of one of the listings (e.g., listing 510-2) displayed in GUI 500. In response to the user selection of listing 510-2, another set of listings representative of another grouping of communication instances of distinct types may be displayed in GUI 500. FIG. 5B illustrates GUI 500 with another set 560 of listings (e.g., listings 510-2, 510-6, and 510-7) representative of another grouping of communication instances of distinct types displayed therein. As shown in FIG. 5B, in certain examples, each of the listings 510-2, 510-6, and 510-7 in the other grouping may be representative of a communication instance associated with a common contact. The communication instances in the other grouping may be arranged chronologically and/or may represent a thread of communication instances with the contact. In the example shown in FIG. 5B, the other grouping includes a missed call, a text message, and an e-mail message associated with a contact known as "Kevin." Each of the listings 510-2, 510-6, and 510-7 shown in FIG. 5B may be selectable and may provide a link to a corresponding communication instance, to additional information about the corresponding communication instance, or to a thread of communications instances in which the corresponding communication instance is included. For example, listing 510-6 may represent a single text message or a condensed thread of text messages with a contact, and a user selection of listing 510-6 may launch a GUI view of the text message or the thread of text messages, respectively.

In certain embodiments, the other set 560 of listings may be displayed as a subset within the set 505 of listings in GUI 500, such as is shown in FIG. 5B. The subset may represent a sub-grouping of communication instances. As an example, as shown in FIG. 5A, one or more of the listings 510 in set 505 may include an expansion indicator (e.g., expansion indicators 570-1 through 570-5, collectively referred to herein as "expansion indicators 570"). A user selection of one of the listings (e.g., listing 510-2) in set 505 may include a user selection of an expansion indicator (e.g., expansion indicator 570-2) associated with the listing. In response to a detection of a user selection of expansion indicator 570-2, the GUI view shown in FIG. 5A may be modified to become the GUI view shown in FIG. 5B and in which the listing 510-2 corresponding to expansion indicator 570-2 is expanded within the set 505 of listings and the other set 560 of listings (listings 510-2, 510-6, and 510-7) is displayed within the expanded listing 510-2. As shown in FIG. 5B, expansion indicator 570-2 may be replaced with a condensing indicator 580 when listings 510-2 is expanded. In response to detection of a user selection of condensing indicator 580, the GUI view shown in FIG. 5B may be modified to become the GUI view shown in FIG. 5A in which the expanded listing 510-2 is condensed within the set 505 of listings to hide the other set 560 of listings.

In certain embodiments, GUI 500 may be displayed in a context of an interactive lock state of a device. For example, GUI 500 may be displayed on display 220 of device 200 (e.g., a mobile phone device) operating in an interactive lock state. As used herein, "interactive lock state" may refer to an operational state of a device in which certain user inputs and/or device operations are allowed and other user inputs and/or device operations are not allowed. For instance, device 200 may accept and respond to GUI viewing input commands, including any of those described herein but may prevent an outgoing voice call while in an interactive lock state. Accordingly, a user of device 200 may view GUI 500 and provide input to modify the views in GUI 500 while device 200 operates in an interactive lock state. An interactive lock state may be indicated by a lock graphical object 590 displayed in GUI 500, as shown in FIGS. 5A-5B.

Figure 6A:
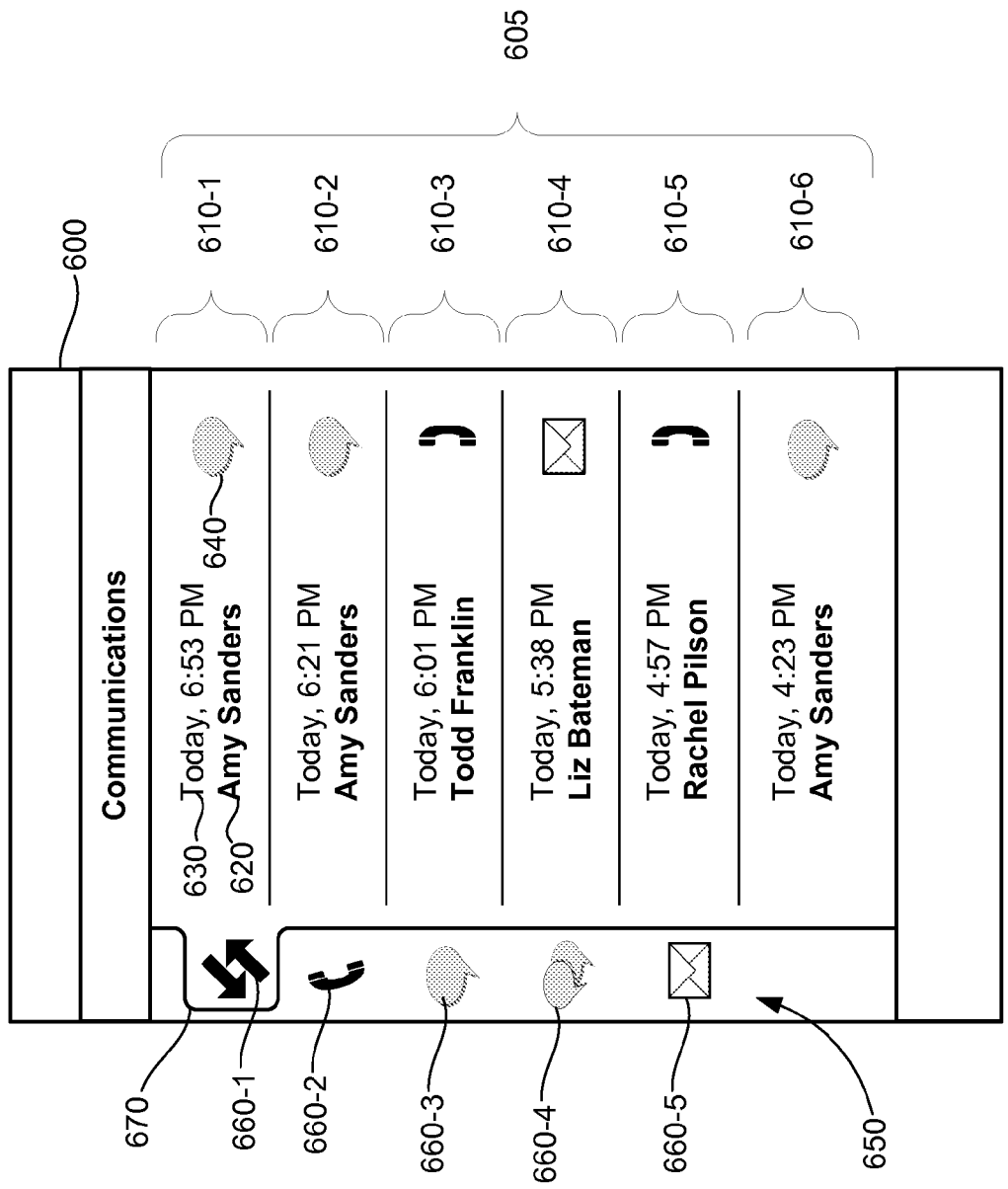
FIGS. 6A-6B illustrate another graphical user interface having exemplary converged communications views displayed therein.
Figure 6B:
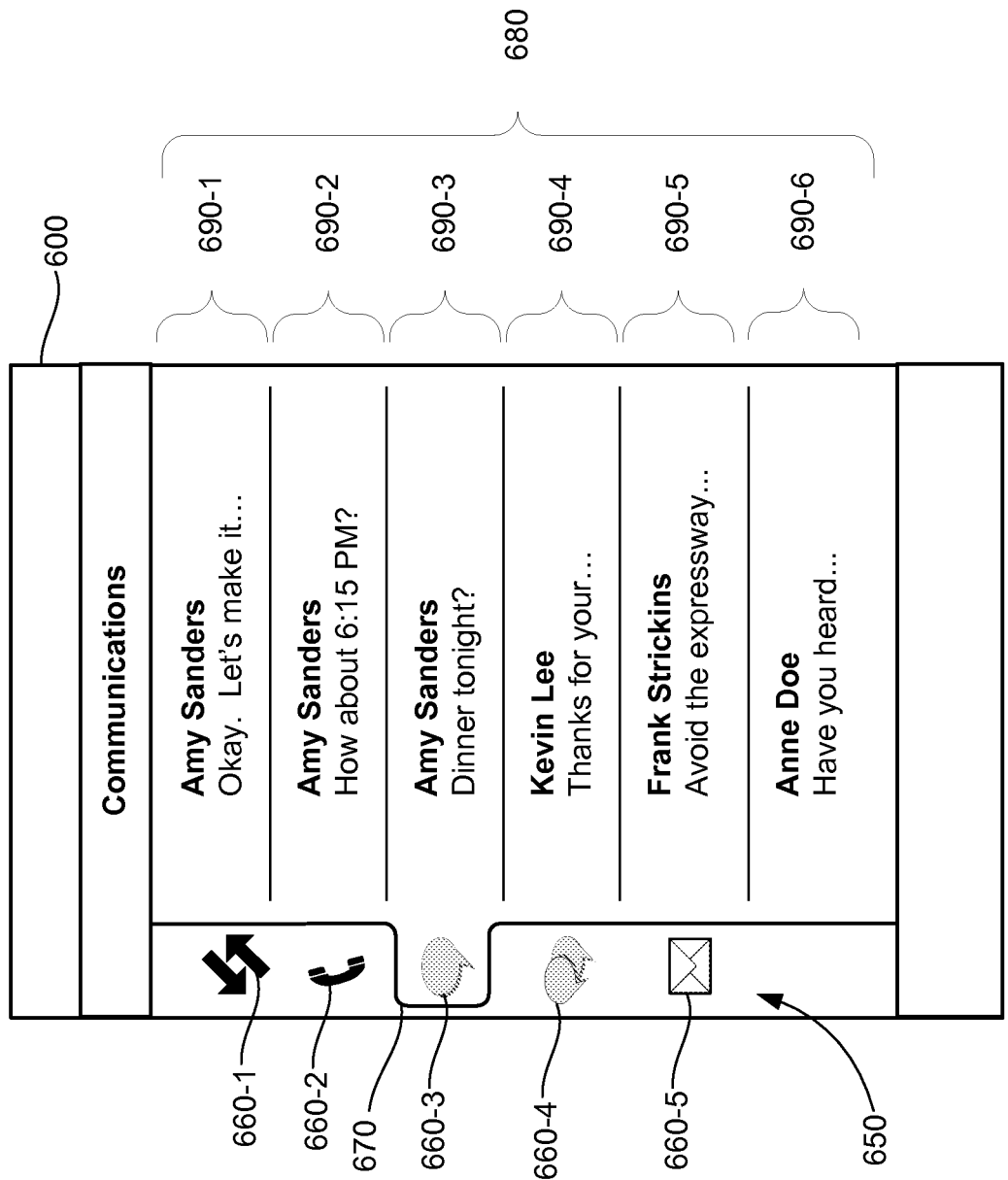

FIGS. 6A-6B illustrate another graphical user interface 600 ("GUI 600") that may be displayed by I/O facility 170. As shown in FIG. 6A, GUI 600 may include a set 605 of listings (e.g., listings 610-1 through 610-6, collectively referred to herein as "listings 610") representative of a grouping of communication instances of distinct types. In the illustrated example, listings 610-1, 610-2, and 610-6 are representative of chat message type communication instances, listings 610-3 and 610-5 are representative of voice type communication instances, and listing 610-4 is representative of an e-mail message type communication instance.

The grouping of communication instances represented by the set 605 of listings 610 may be generated by communications convergence facility 150 as described above. In the example illustrated in FIG. 6A, the grouping of communication instances includes communication instances of distinct types arranged in chronological order (e.g., in order of most recently received). This is illustrative only. Other groupings of communication instances may be represented in GUI 600 in other examples.

In certain embodiments, each of the listings 610 in GUI 600 may be associated with a contact, such as the contact associated with the communication instance corresponding to the listing 610. For example, listing 610-1 may be associated with a contact identified as "Amy Sanders," where "Amy Sanders" is a contact associated with (e.g., a sender of) the text message communication instance represented by listing 610-1.

As further shown in FIG. 6A, each of the listings 610 may include one or more graphical objects descriptive of or otherwise associated with a communication instance represented by the corresponding listing 610. For example, each of the listings 610 may include graphical objects representative of a contact associated with the corresponding communication instance (e.g., a contact name and an image associated with the contact), contents or partial contents of the corresponding communication instance, the type of the corresponding communication instance, and timestamp information associated with the corresponding communication instance. As an example, listing 610-1 includes a display of a contact name 620, a day and time 630 associated with the corresponding communication instance, and a visual indicator 640 of the type (e.g., a chat message communication type) of the corresponding communication instance. In FIG. 6A, each of the other listings 610-2 through 610-6 includes similar graphical objects.

GUI 600 may include a menu 650 of selectable objects (e.g., selectable objects 660-1 through 660-5, collectively referred to herein as "selectable objects 660" or "menu objects 660") displayed together with the set 605 of listings 610. In the example illustrated in FIG. 6A, menu object 660-1 is associated with an option for displaying one or more listings 610 representative of recent communication instances of distinct types, such as the listings 610 included in set 605 in FIG. 6A. menu object 660-2 is associated with an option for displaying only certain listings 610 representative of voice type communication instances, menu object 660-3 is associated with an option for displaying only certain listings 610 representative of text message type communication instances, menu object 660-4 is associated with an option for displaying only certain listings 610 representative of chat message type communication instances, and menu object 660-5 is associated with an option for displaying only certain listings 610 representative of e-mail type communication instances. Other menu objects 610 and/or arrangement of menu objects 610 may be displayed in other embodiments.

A selection tab 670 may also be displayed in GUI 600 and may indicate a currently selected menu object (e.g., menu object 660-1) within menu 650. In FIG. 6A, menu object 660-1 is selected as indicated by selection tab 670. A user may select another of the menu objects (e.g., menu object 660-3) from menu 650. This may be accomplished in any suitable way, and the user selection of a menu object may be detected as described above.

As an example, a user may select menu object 660-3 displayed in GUI 600 by moving selection tab 670 to menu object 660-3, and user interface facility 160 may detect the user selection. In response to the user selection of menu object 660-3, another set of listings representative of another grouping of communication instances may be displayed in GUI 600. FIG. 6B illustrates GUI 600 with another set 680 of listings (e.g., listings 690-1 through 690-6, collectively referred to herein as "listings 690") representative of another grouping of communication instances displayed therein. The communication instances in the other grouping may be arranged chronologically, or in any other suitable configuration. In certain embodiments, each of the listings 690 may be selectable and may provide a link to a corresponding communication instance, to additional information about the corresponding communication instance, or to a thread of communications instances in which the corresponding communication instance is included.

As shown in FIG. 6B, in certain examples, each of the listings 690 in the other set 680 may be representative of a chat message type communication instance associated with a contact. In the example shown in FIG. 6B, the other grouping includes six text message type communication instances. Hence, a user may select menu object 660-3 to launch a GUI view of text message communication instances. In certain embodiments, in response to a user selection of menu object 660-3, a grouping of communication instances of distinct types (e.g., the grouping represented by the set 605 of listings 610 in FIG. 6A) may be filtered to generate another grouping of communication instances (e.g., the grouping represented by the set 680 of listings 690 in FIG. 6B). In the present example, the filtering is based on a type of communication associated with the selected menu object 660-3 such that the other grouping represented by the set 680 of listings 690 in FIG. 6B includes only a certain type of communication instances.

Figure 7A:
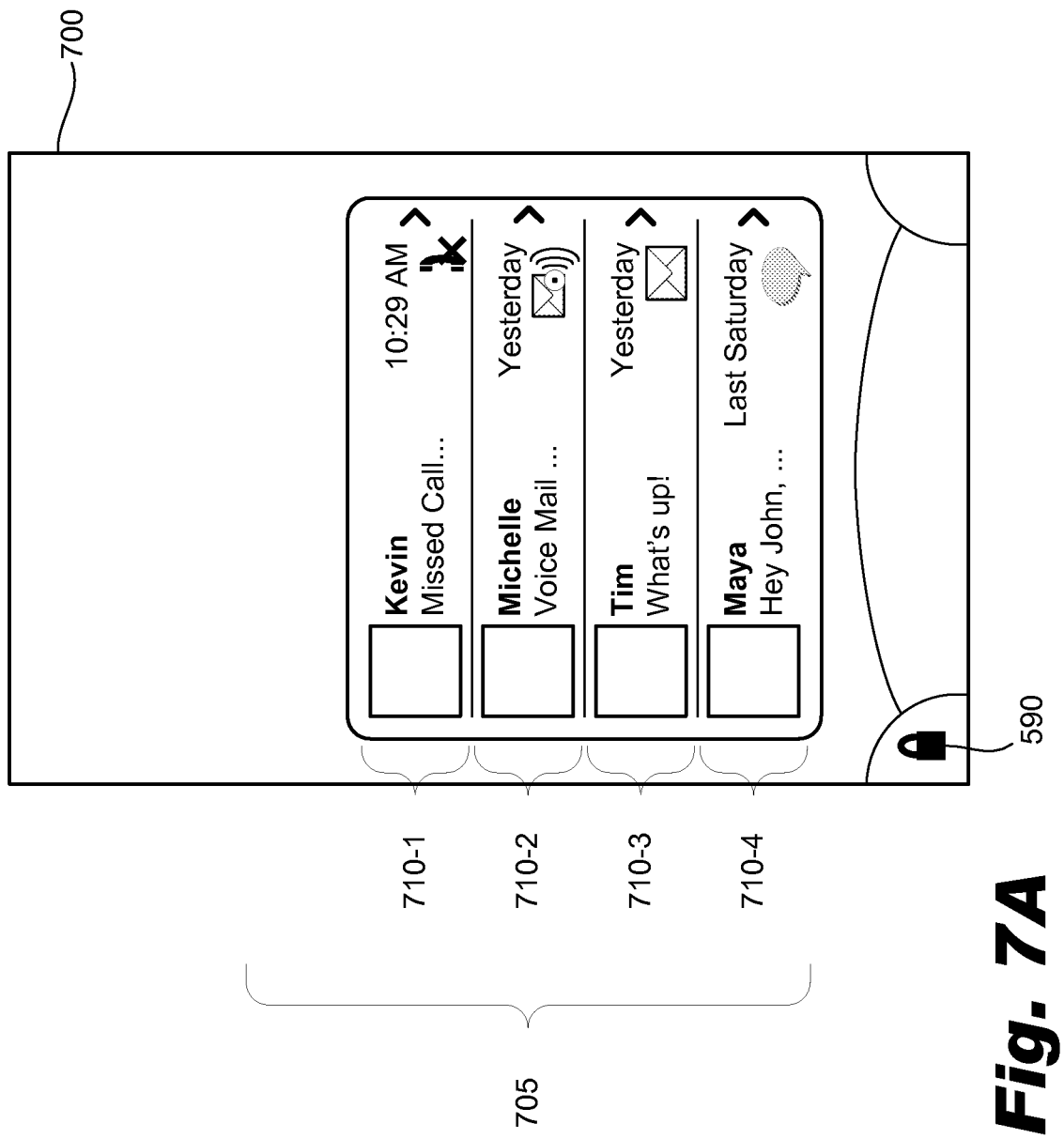
FIGS. 7A-7E illustrate exemplary graphical user interface views associated with a voice communication instance.

FIGS. 7A-7E illustrate exemplary graphical user interface views that may be displayed by I/O facility 170. FIG. 7A shows a graphical user interface 700 ("GUI 700") including a set 705 of listings (e.g., listings 710-1 through 710-4) representative of a grouping of communication instances of distinct types. The grouping of communication instances represented by the set 705 of listings 710-1 through 710-4 may be generated by communications convergence facility 150 as described above.

Figure 7B:
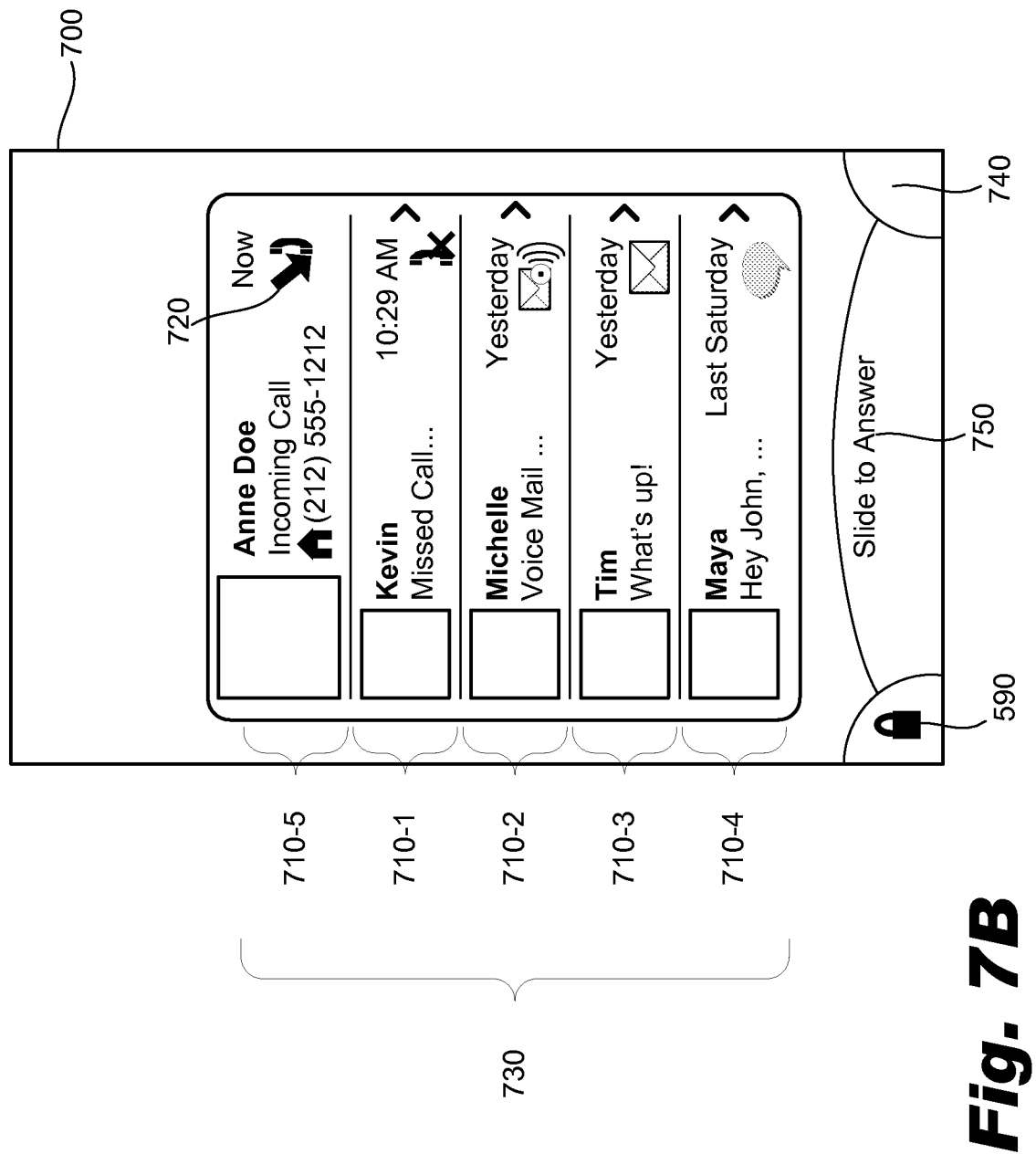

While the GUI view shown in FIG. 7A is displayed, an incoming voice communication instance (e.g., an incoming voice call) may be received by device 200 or other communication device. FIG. 7B illustrates another GUI view that may be displayed in GUI 700 and in which at least one graphical object representative of the incoming voice communication instance is included. The graphical object may include listing 710-5 and/or one or more objects in listing 710-5, including a visual indicator 720 indicating an incoming voice communication instance. In response to detection of an incoming voice communication instance, listing 710-5 may be appended to the set 705 of listings 710-1 through 710-5 shown in FIG. 7A to form another set 730 of listings 710-1 through 710-5 as shown in FIG. 7B.

A user may accept or not accept the incoming voice communication instance. When the user accepts the incoming communication instance, an active voice communication session may be established with a contact (e.g., "Anne Doe" in FIG. 7B) from whom the incoming voice communication instance is received. The acceptance and connection of the incoming voice communication instance to establish the active voice communication session may be accomplished in any suitable manner. As an example, the GUI views shown in FIGS. 7A-7B represent operation of a device (e.g., device 200) in an interactive lock state, as indicated by lock graphical object 590 displayed in GUI 700. In certain implementations, a user may be able to slide an object (e.g., a finger or thumb) on the surface of a display screen from an area generally proximate to lock graphical object 590 toward another designated area 740 in GUI 700. This action may be indicated in GUI 700, such as by a graphical object 750 indicating a touch gesture (e.g., "slide to answer") to be made to accept the incoming voice communication instance.

Figure 7C:
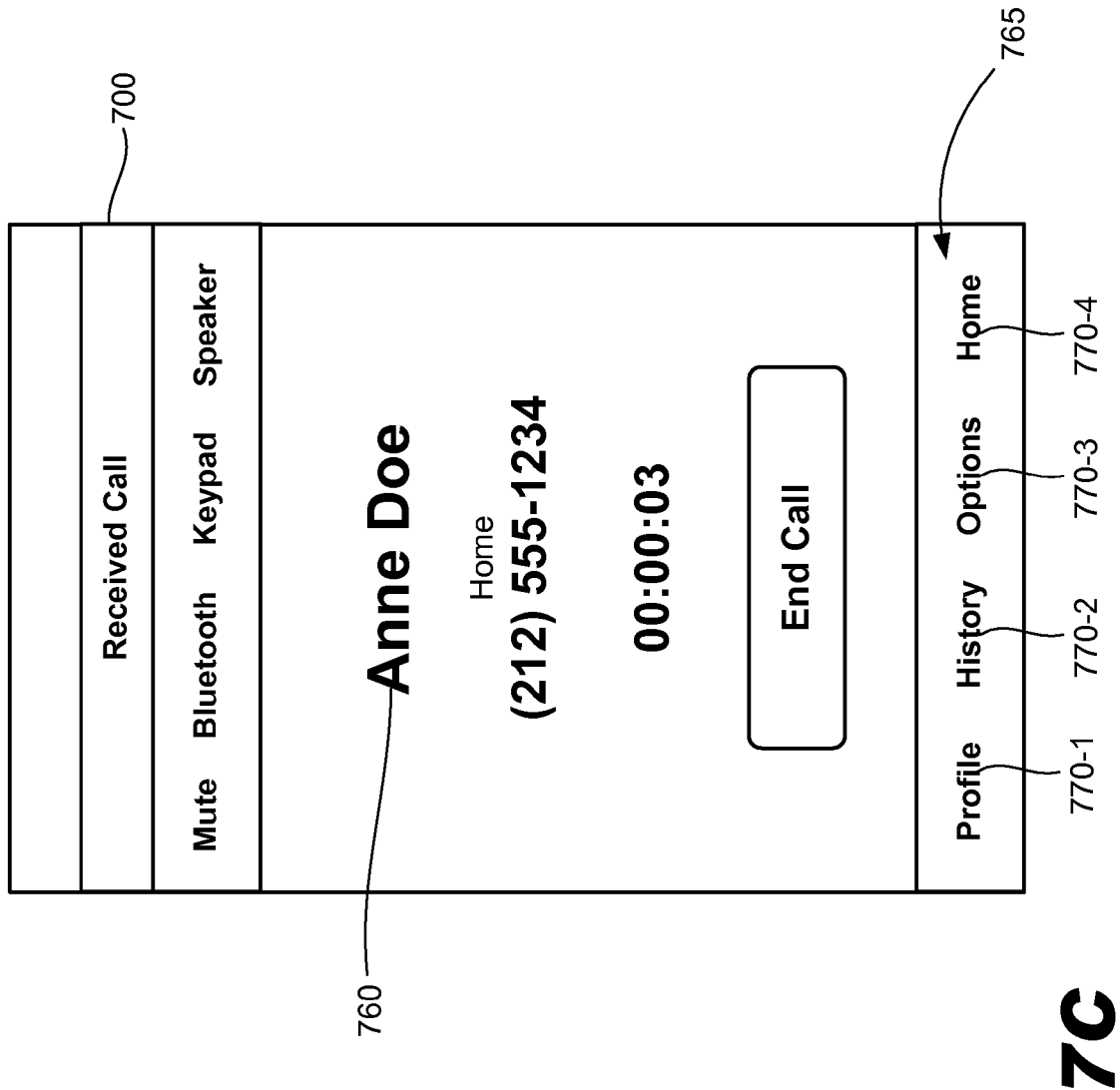

FIG. 7C illustrates an exemplary GUI view that may be displayed in GUI 700 when a voice communication session is active (e.g., after the incoming voice communication instance illustrated in FIG. 7B is accepted and established). The GUI view may include one or more graphical objects representative of the active voice communication session and/or information related to the active voice communication session. For example, graphical object 760 indicates a contact (e.g., "Anne Doe") participating in the active voice communication session. Other graphical objects may indicate other related information, including a phone number and/or duration of the communication session, for example.

The GUI view shown in FIG. 7C may include a menu 765 of selectable objects (e.g., selectable objects 770-1 through 770-4, collectively referred to herein as "selectable objects 770" or "menu objects 770") displayed together in GUI 700 with one or more graphical objects (e.g., graphical object 760) representative of the active voice communication session. In the example illustrated in FIG. 7C, menu object 770-1 is associated with an option for displaying a profile card for the contact associated with the active voice communication session, menu object 770-2 is associated with an option for displaying a history of communication instances associated with a contact participating in the active voice communication session, menu object 770-3 is associated with another options menu, which may include one or more options related to the active voice communication session, and menu object 770-4 is associated with an option for displaying a "home" GUI view. Other menu objects 770 and/or arrangements of menu objects 770 may be displayed in other embodiments.

Figure 7D:
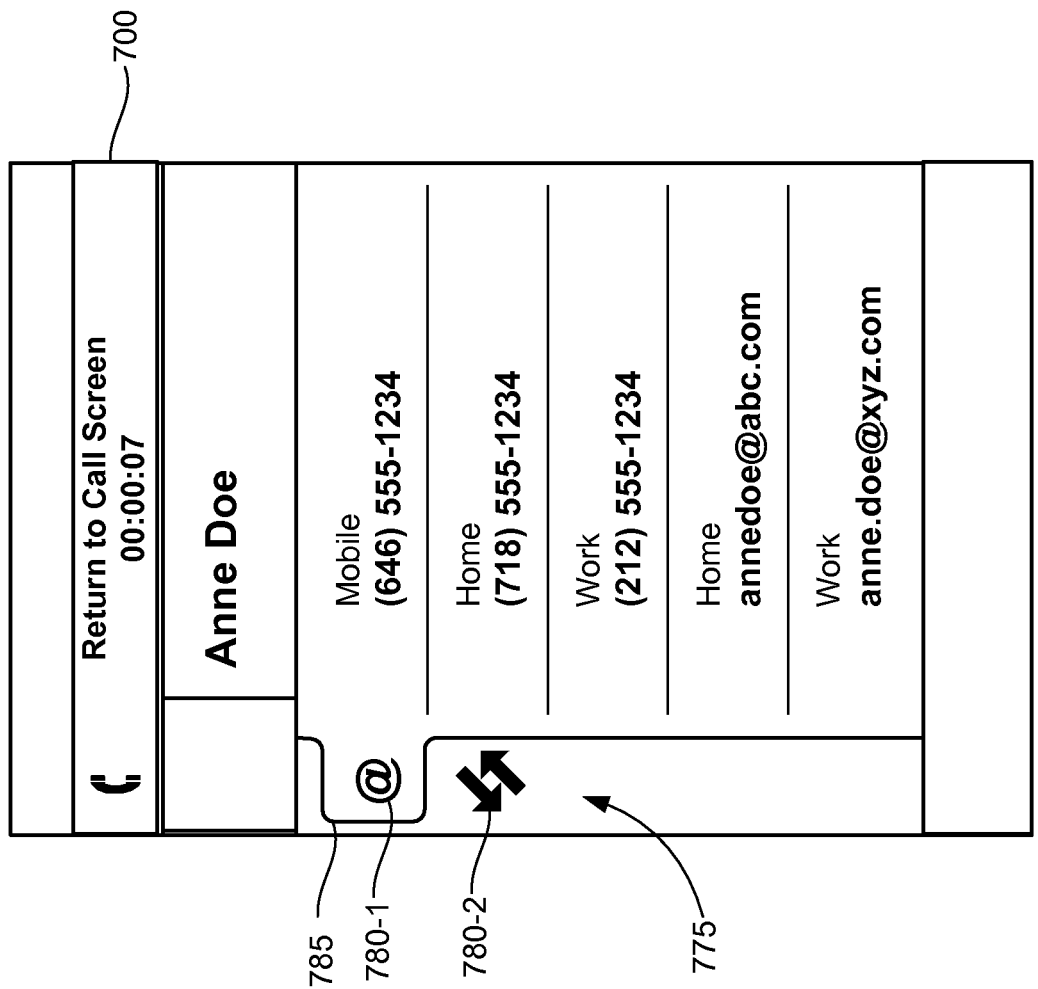

While the GUI view shown in FIG. 7C is displayed, a user may select menu object 770-1. The user selection may be made and detected in any suitable way, such as by an object touch of menu object 770-1 on a display screen. In response to the user selection of menu object 770-1, the GUI view shown in FIG. 7D may be displayed in GUI 700. As shown in FIG. 7D, the GUI view may include one or more graphical objects representative of a profile card for a contact (e.g., "Anne Doe") associated with the active voice communication session.

As shown in FIG. 7D, the profile card GUI view may include a menu 775 of selectable objects (e.g., selectable objects 780-1 through 780-2, collectively referred to herein as "selectable objects 780" or "menu objects 780"). In FIG. 7D, menu object 780-1 is currently selected by a selection tab 785. Menu object 780-1 may be associated with an option for displaying contact data associated with the profile card. In the illustrated example, the contact data includes phone numbers and e-mail addresses for "Anne Doe."

While the GUI view shown in FIG. 7D is displayed, a user may select menu object 780-2. The user selection may be made and detected in any suitable way, such as by an object touch of menu object 780-2 on a display screen. Menu object 780-2 may be associated with an option for displaying recent communication instances associated with the contact participating in the active voice communication session. In the present example, this may include recent communication instances between a user and the contact identified as "Anne Doe."

Figure 7E:
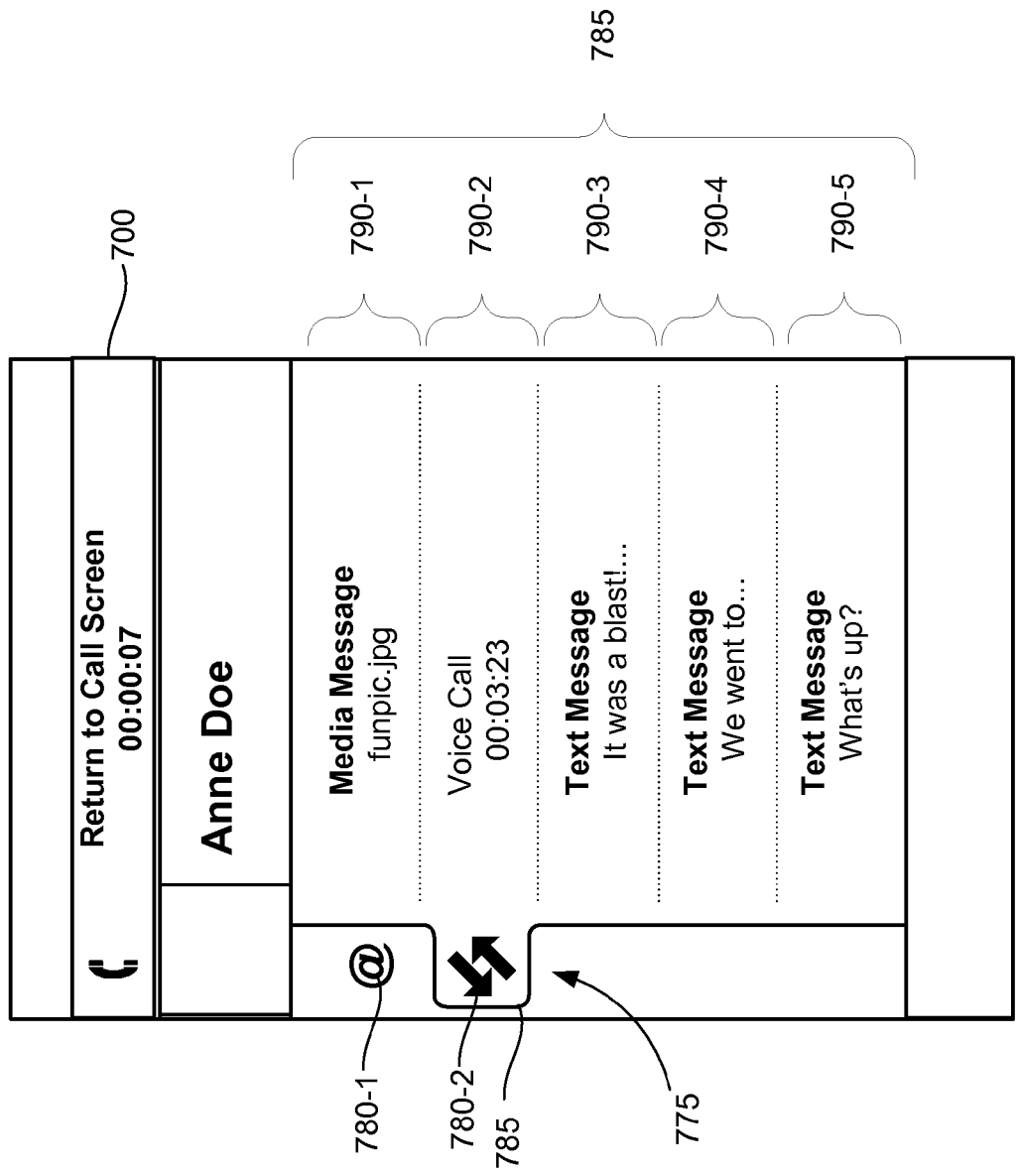

In response to a user selection of menu object 780-2 in FIG. 7D, the GUI view shown in FIG. 7E may be displayed in GUI 700. As shown in FIG. 7E, GUI view may include a set 785 of listings (e.g., listings 790-1 through 790-5, collectively referred to herein as "listings 790") representative of a grouping of communication instances associated with "Anne Doe." The grouping may be generated by communications convergence facility 150 as described above and may include communications instances of distinct types. The communication instances in the grouping may be arranged chronologically and/or may represent a thread of communication instances with the "Anne Doe." In the example shown in FIG. 7E, the grouping includes a media message, a voice call, and three text messages, which may be a thread of communication instances between a user and "Anne Doe."

The GUI views shown in FIGS. 7D-7E may be displayed without interruption to the active voice communication session represented by graphical object 760 in FIG. 7C. Accordingly, a user may access and view information related to the active voice communication session, including a contact profile card and/or a history of communication instances with the contact, while continuing the active voice communication session.

In certain examples, a user may directly access the GUI view shown in FIG. 7E from the GUI view shown in FIG. 7C by selecting menu object 770-2, which may be associated with an option for displaying a history of communication instances with a contact associated with an active voice communication session.

Figure 8:
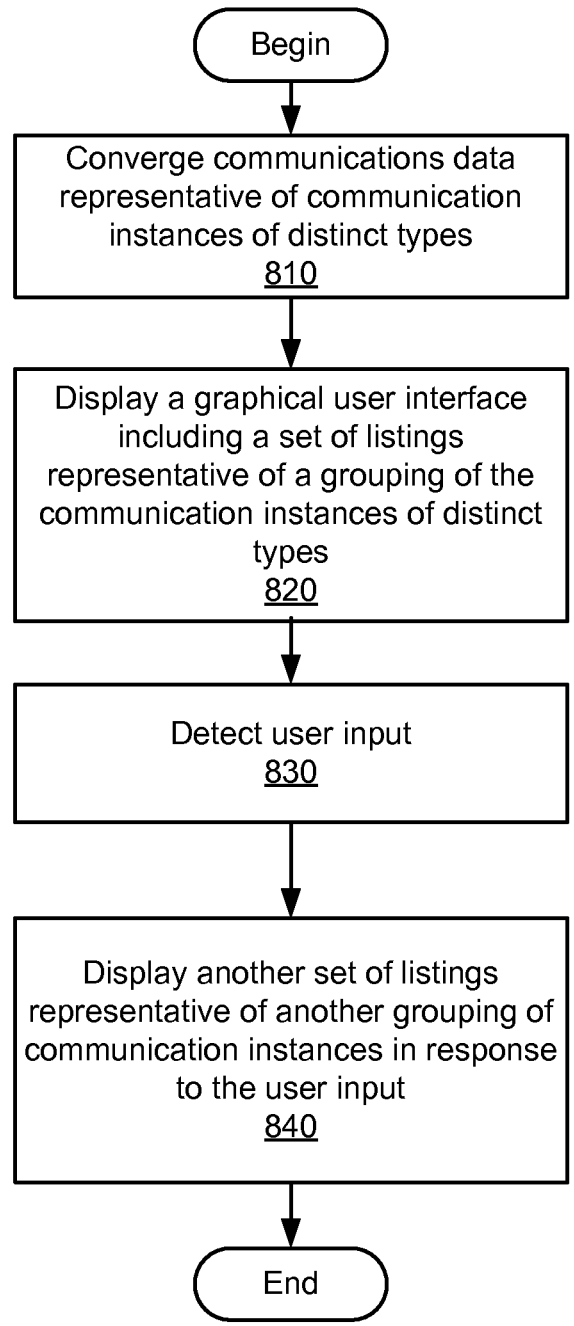
FIG. 8 illustrates an exemplary communications convergence and user interface method.

FIG. 8 illustrates an exemplary converged communications and user interface method. While FIG. 8 illustrates exemplary steps according to one embodiment, other embodiments may omit, add to, reorder, and/or modify any of the steps shown in FIG. 8.

In step 810, communications data representative of communication instances of distinct types is converged. Step 810 may be performed in any of the ways described above, including communications convergence facility 150 retrieving communications data from heterogeneous communication facilities 110 and using the communications data to generate one or more groupings of communication instances of distinct types. In certain examples, the converging may be based on a contact and may generate a grouping of communication instances of distinct types in which each of the communication instances in the grouping is associated with the contact.

In step 820, a GUI is displayed. The GUI includes a set of listings representative of a grouping of the converged communication instances of distinct types. Step 820 may be performed in any of the ways described above, including user interface facility 160 providing data representative of the GUI to I/O facility 170 for display. In certain embodiments, at least one of the communication instances of distinct types in the displayed grouping includes a voice type communication instance.

In step 830, user input is detected. Step 830 may be performed in any of the ways described above, including I/O facility 170 sensing user input and providing a signal representative of the user input to user interface facility 160, and user interface facility 160 detecting the user input from the signal. In certain examples, the user input may include a user selection of one of the listings displayed in step 820, as described above. In other examples, the user input may include a user selection of a selectable menu object displayed in the graphical user interface, as described above.

In step 840, another set of listings representative of another grouping of communication instances is displayed in response to the user input. Step 840 may be performed in any of the ways described above, including user interface facility 160 providing data representative of the other set of listing to I/O facility 170 for display. In certain embodiments, the other grouping of communication instances may include communication instances of distinct types and in which each of the communication instances is associated with a common contact. Such a grouping of communication instances of distinct types associated with a contact may be displayed in response to a user selection of one of the listings displayed in step 820 as described above. In certain embodiments, the other grouping of communication instances may be a filtered subset of the grouping of communication instances of distinct types displayed in step 820. Such a filtered grouping may be displayed in response to a user selection of a selectable menu option, including an option associated with one of the distinct types of communication instances, as described above.

One or more of the steps shown in FIG. 8 may be performed in response to a predetermined event and/or other user input. In certain embodiments, step 810 and/or step 820 may be performed in response to a predetermined user input command. For example, a graphical object representative of a communication session (e.g., an active voice communication session) or a profile card associated with a contact may be displayed in a GUI. A user input command, such as a user selection of a menu object displayed in the GUI, may be received, and step 820 may be performed in response to the user input command.

Figure 9:
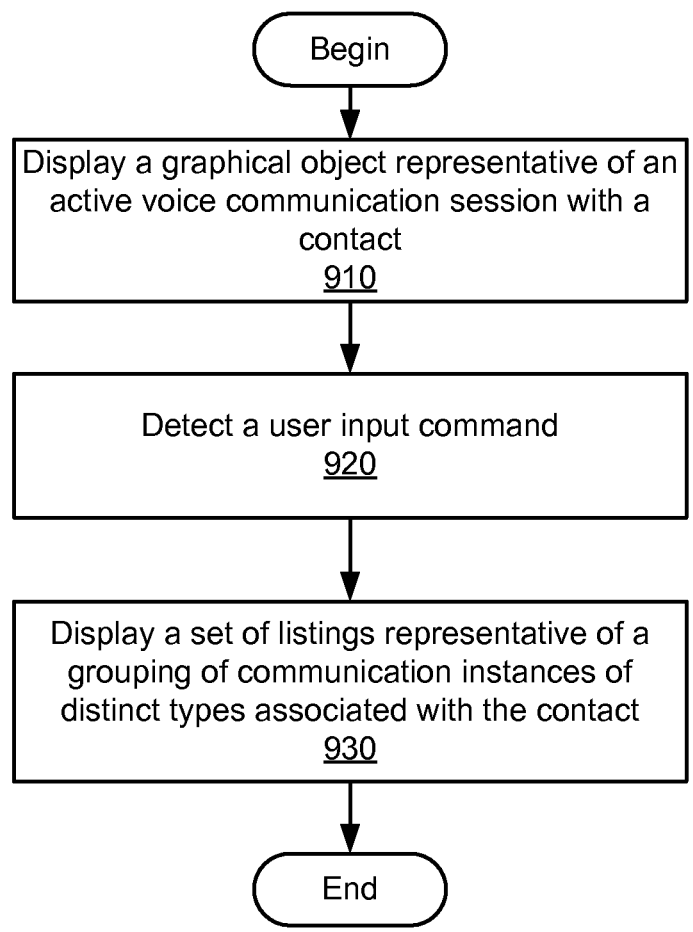
FIG. 9 illustrates another exemplary communications convergence and user interface method.

FIG. 9 illustrates another exemplary converged communications and user interface method. While FIG. 9 illustrates exemplary steps according to one embodiment, other embodiments may omit, add to, reorder, and/or modify any of the steps shown in FIG. 9.

In step 910, a graphical object representative of an active voice communication session with a contact is displayed. Step 910 may be performed in any of the ways described above, including user interface facility 160 providing data representative of the graphical object to I/O facility 170 for display.

In step 920, a user input command is detected. Step 920 may be performed in any of the ways described above, including user interface facility 160 detecting a signal representing a user selection of a selectable menu object displayed together with the graphical object in a GUI.

In step 930, a set of listings is displayed. The set of listings is representative of a grouping of communication instances of distinct types associated with the contact. Step 930 may be performed in response to the user input command and in any of the ways described above, including communications convergence facility 150 converging communications data to generate the grouping and user interface facility 160 providing data representative of the set of listings representative of the grouping to I/O facility 170 for display.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
converging communications data representative of communication instances of distinct types based on a contact associated with said communication instances;
generating a thread of communications with said contact, said thread of communications including a plurality of said communication instances of distinct types with said contact;
displaying, in a graphical user interface in response to a user selection of a menu object included in said graphical user interface and associated with a communications history, a set of listings associated with a plurality of selectable objects different from said menu object and representative of said plurality of said communication instances of said distinct types in said thread of communications, said plurality of selectable objects, and a selection tab indicating a current selection of one of a plurality of selectable objects, wherein each of said communication instances in said plurality of said communication instances is associated with said contact and at least one of said communication instances represented in said set of listings includes a voice type communication instance;
displaying a graphical object representative of an active voice communication session with said contact;
performing said displaying said set of listings representative of said plurality of said communication instances of said distinct types in said thread of communications and associated with said contact without interruption to said active voice communication session;
detecting a user selection of one of said listings displayed in said graphical user interface, said selected listing associated with said contact; and
displaying, in response to said user selection, another set of listings representative of another thread of communication instances of said distinct types, wherein each of said communication instances in said another thread of communication instances of said distinct types is associated with said contact.

2. The method of claim 1, wherein said another set of listings is displayed as a subset within said set of listings in said graphical user interface.

3. The method of claim 1, further comprising:
detecting a user selection of another one of said plurality of selectable objects, said selected object associated with one of said distinct types of said communication instances; and
filtering said set of listings representative of said plurality of said communication instances of said distinct types based on said one of said distinct types associated with said another selected object.

4. The method of claim 1, wherein at least one other of said communication instances of said distinct types represented in said set of listings includes at least one of a text message type communication instance, a media message type communication instance, an e-mail message type communication instance, a chat message type communication instance, and a subscriber feed type communication instance.

5. A method comprising:
displaying a graphical object on a display, said graphical object representative of an active voice communication session with a contact;
generating a thread of communications with said contact, said thread of communications including a plurality of communication instances of distinct types with said contact;
displaying, in a graphical user interface in response to a user selection of a menu object included in said graphical user interface and associated with a communications history, a set of listings associated with a plurality of selectable objects different from said menu object and representative of said plurality of communication instances of distinct types in said thread of communications, said plurality of selectable objects, and a selection tab indicating a current selection of one of a plurality of selectable objects, wherein said set of listings is displayed without interruption to said active voice communication session,
wherein each of said communication instances of said distinct types is associated with said contact;
detecting a user selection of one of said listings displayed in said graphical user interface; and displaying, in response to said user selection, another set of listings representative of another thread of communication instances of said distinct types, wherein each of said communication instances in said another thread of communication instances of said distinct types is associated with said contact.

6. A system comprising:
a communications convergence facility configured to converge communications data representative of a plurality of communication instances of distinct types based on a contact associated with said communication instances; and
a user interface facility communicatively coupled to said communications convergence facility and configured to
display a graphical object representative of an active voice communication session with said contact,
generate a thread of communications with said contact, said thread of communications including said plurality of communication instances of distinct types with said contact;
display, in a graphical user interface in response to a user selection of a menu object included in said graphical user interface and associated with a communications history, a set of listings associated with a plurality of selectable objects different from said menu object and representative of said plurality of said communication instances of said distinct types in said thread of communications, said plurality of selectable objects, and a selection tab indicating a current selection of one of a plurality of selectable objects, said plurality of communication instances associated with said contact, wherein said graphical user interface is displayed without interruption to said active voice communication session;
detect a user selection of one of said listings displayed in said graphical user interface, said selected listing associated with said contact, and
provide, in response to said user selection, another set of listings representative of another communications thread including said communication instances of said distinct types for display in said graphical user interface, wherein each of said communication instances in said another communications thread is associated with said contact.

7. The system of claim 6, further comprising a plurality of heterogeneous communication facilities, wherein said convergence includes retrieval of said communications data from said plurality of heterogeneous communication facilities.

8. The system of claim 6 implemented on a mobile phone device.

9. The method of claim 5, wherein said another set of listings is displayed as a subset within said set of listings in said graphical user interface.

10. The method of claim 5, further comprising:
detecting a user selection of another one of said plurality of selectable objects, said selected object associated with one of said distinct types of said communication instances; and
filtering said set of listings representative of said plurality of said communication instances of said distinct types based on said one of said distinct types associated with said another selected object.

11. The method of claim 5, wherein at least one other of said communication instances of said distinct types represented in said set of listings includes at least one of a text message type communication instance, a media message type communication instance, an e-mail message type communication instance, a chat message type communication instance, and a subscriber feed type communication instance.

12. A system comprising:
a processor; and
a user interface facility configured to direct said processor to
display a graphical object on a display, said graphical object representative of an active voice communication session with a contact,
generate a thread of communications with said contact, said thread of communications including a plurality of communication instances of distinct types with said contact,
display, in a graphical user interface in response to a user selection of a menu object included in said graphical user interface and associated with a communications history, a set of listings associated with a plurality of selectable objects different from said menu object and representative of said plurality of communication instances of distinct types in said thread of communications, said plurality of selectable objects, and a selection tab indicating a current selection of one of a plurality of selectable objects, wherein said set of listings is displayed without interruption to said active voice communication session, wherein each of said communication instances of said distinct types is associated with said contact,
detect a user selection of one of said listings displayed in said graphical user interface, and
display, in response to said user selection, another set of listings representative of another thread of communication instances of said distinct types, wherein each of said communication instances in said another thread of communication instances of said distinct types is associated with said contact.

13. The system of claim 12, wherein said another set of listings is displayed as a subset within said set of listings in said graphical user interface.

14. The system of claim 12, wherein said user interface facility is further configured to direct said processor to
detect a user selection of another one of said plurality of selectable objects, said selected object associated with one of said distinct types of said communication instances, and
filter said set of listings representative of said plurality of said communication instances of said distinct types based on said one of said distinct types associated with said another selected object.

15. The system of claim 12, wherein at least one other of said communication instances of said distinct types represented in said set of listings includes at least one of a text message type communication instance, a media message type communication instance, an e-mail message type communication instance, a chat message type communication instance, and a subscriber feed type communication instance.

16. A non-transitory computer-readable medium including instructions configured to direct a processor to:
converge communications data representative of communication instances of distinct types based on a contact associated with said communication instances;
generate a thread of communications with said contact, said thread of communications including said converged communications data of communication instances of distinct types based on said contact associated with said communication instances;
display, in a graphical user interface in response to a user selection of a menu object included in said graphical user interface and associated with a communications history, a set of listings associated with a plurality of selectable objects different from said menu object and representative of said thread of said converged communications data of communication instances of said distinct types, said plurality of selectable objects, and a selection tab indicating a current selection of one of a plurality of selectable objects, wherein each of said communication instances in said thread of communications is associated with said contact and at least one of said communication instances represented in said set of listings includes a voice type communication instance;

display a graphical object representative of an active voice communication session with said contact;

perform said display of said set of listings representative of said plurality of said communication instances of said distinct types in said thread of communications and associated with said contact without interruption to said active voice communication session;

detect a user selection of one of said listings displayed in said graphical user interface, said selected listing associated with said contact; and display, in response to said user selection, another set of listings representative of another thread of communication instances of said distinct types, wherein each of said communication instances in said another thread of communication instances of said distinct types is associated with said contact.

17. A non-transitory computer-readable medium including instructions configured to direct a processor to:

display a graphical object on a display, said graphical object representative of an active voice communication session with a contact;

generate a thread of communications with said contact, said thread of communications including a plurality of communication instances of distinct types with said contact;

display, in a graphical user interface in response to a user selection of a menu object included in said graphical user interface and associated with a communications history, a set of listings associated with a plurality of selectable objects different from said menu object and representative of said plurality of communication instances of distinct types in said thread of communications, said plurality of selectable objects, and a selection tab indicating a current selection of one of a plurality of selectable objects displayed in said graphical user interface, wherein said set of listings is displayed without interruption to said active voice communication session, wherein each of said communication instances of said distinct types is associated with said contact;

detect a user selection of one of said listings displayed in said graphical user interface; and display, in response to said user selection, another set of listings representative of another thread of communication instances of said distinct types, wherein each of said communication instances in said another thread of communication instances of said distinct types is associated with said contact.

\* \* \* \* \*